(12) United States Patent
Neuschaefer-Rube et al.

(10) Patent No.: US 10,962,425 B2
(45) Date of Patent: Mar. 30, 2021

(54) ARRANGEMENT AND METHOD FOR MEASURING A FORCE OR A TORQUE, WITH AT LEAST TWO MAGNETIC SENSORS SPACED APART FROM ONE ANOTHER

(71) Applicant: Schaeffler Technologies AG & Co. KG, Herzogenaurach (DE)

(72) Inventors: Stephan Neuschaefer-Rube, Herzogenaurach (DE); Jan Matysik, Nuremberg (DE); Christian Mock, Schweinfurt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/572,644

(22) PCT Filed: May 18, 2016

(86) PCT No.: PCT/DE2016/200235
§ 371 (c)(1),
(2) Date: Nov. 8, 2017

(87) PCT Pub. No.: WO2016/184463
PCT Pub. Date: Nov. 24, 2016

(65) Prior Publication Data
US 2018/0156676 A1     Jun. 7, 2018

(30) Foreign Application Priority Data

May 21, 2015   (DE) .................... 10 2015 209 286.0

(51) Int. Cl.
*G01L 1/12*     (2006.01)
*G01L 3/10*     (2006.01)

(52) U.S. Cl.
CPC .............. *G01L 1/125* (2013.01); *G01L 3/102* (2013.01)

(58) Field of Classification Search
CPC ......... G01L 3/102; G01L 3/105; G01L 3/103; G01L 1/122; G01L 1/125; G01L 3/104;
(Continued)

(56) References Cited

U.S. PATENT DOCUMENTS 3,513,469 A * 5/1970 Frazier .................... H03M 1/26
                                                   324/173
3,772,675 A * 11/1973 Bose ........................ H03M 1/30
                                                    341/15
(Continued)

FOREIGN PATENT DOCUMENTS

CN       1045178 A      9/1990
CN       1282420 A      1/2001
(Continued)

*Primary Examiner* — Brandi N Hopkins
(74) *Attorney, Agent, or Firm* — Volpe Koenig (57) ABSTRACT

An arrangement for measuring a force and/or a torque using the inverse-magnetostrictive effect as well a method for a measurement of a force and/or a torque using the inverse-magnetostrictive effect are provided. The force or the torque acts on a machine element (01) that has at least one magnetization area (04) for a magnetization and thus forms a primary sensor for the measurement using the inverse-magnetostrictive effect. The arrangement includes at least two spaced apart magnetic field sensors (06) for measuring a magnetic field (11) caused by the magnetization and also by the force or by the torque, with each of these sensors forming a secondary sensor for the measurement using the inverse-magnetostrictive effect. The arrangement further includes a measurement signal processing unit that is constructed for the signal processing of the measurement signals of the individual magnetic field sensors (06).

11 Claims, 5 Drawing Sheets

(58) Field of Classification Search
CPC .......... Y10T 29/49004; Y10T 29/4902; H01L 41/125
See application file for complete search history.

(56) References Cited

U.S. PATENT DOCUMENTS

| | | | |
|---|---|---|---|
| 4,896,544 A * | 1/1990 | Garshelis | G01L 3/102 73/862.333 |
| 4,933,580 A | 6/1990 | Ishino et al. | |
| 5,259,252 A | 11/1993 | Kruse et al. | |
| 5,491,369 A * | 2/1996 | Ishino | G01L 3/102 310/26 |
| 5,520,049 A | 5/1996 | Butler | |
| 5,708,216 A | 1/1998 | Garshelis | |
| 5,887,335 A | 3/1999 | Garshelis | |
| 6,260,423 B1 | 7/2001 | Garshelis | |
| 6,341,534 B1 | 1/2002 | Dombrowski | |
| 6,389,910 B1 | 5/2002 | Eisenhauer | |
| 6,490,934 B2 | 12/2002 | Garshelis | |
| 6,581,480 B1 * | 6/2003 | May | G01L 3/102 73/862.333 |
| 6,595,073 B1 * | 7/2003 | Yagi | G01L 3/102 29/593 |
| 6,904,814 B2 | 6/2005 | May | |
| 7,093,504 B2 | 8/2006 | Southward | |
| 7,493,831 B2 | 2/2009 | Varonis | |
| 8,087,304 B2 * | 1/2012 | Lee | G01R 33/07 324/207.11 |
| 8,203,334 B2 * | 6/2012 | Baller | G01D 5/145 324/174 |
| 8,494,793 B2 * | 7/2013 | Albertini | G01R 33/022 324/260 |
| 8,578,794 B2 | 11/2013 | Lee | |
| 8,707,824 B2 | 4/2014 | Benkert et al. | |
| 8,893,562 B2 * | 11/2014 | Barraco | G01L 3/102 73/862 |
| 9,347,845 B2 | 5/2016 | Giessibl | |
| 2002/0162403 A1 | 11/2002 | Cripe | |
| 2009/0212770 A1 | 8/2009 | Koyama et al. | |
| 2009/0230953 A1 | 9/2009 | Lee | |
| 2010/0242626 A1 | 9/2010 | Weng | |
| 2011/0239787 A1 * | 10/2011 | Kato | B62D 5/0409 73/862.335 |
| 2013/0125669 A1 | 5/2013 | Barraco et al. | |
| 2013/0181702 A1 * | 7/2013 | May | G01D 5/145 324/243 |
| 2014/0360285 A1 * | 12/2014 | Barraco | G01L 3/105 73/862.333 |
| 2015/0354984 A1 * | 12/2015 | Albrecht | G01D 5/145 324/207.2 |
| 2016/0146679 A1 * | 5/2016 | Neuschaefer-Rube | G01L 1/122 73/862.041 |

FOREIGN PATENT DOCUMENTS

| | | |
|---|---|---|
| CN | 1846123 A | 10/2006 |
| DE | 102010061851 | 9/2011 |
| DE | 102013211000 | 12/2014 |
| EP | 0803053 | 8/2002 |
| EP | 2799827 | 11/2014 |
| WO | 9921151 A2 | 4/1999 |
| WO | 9956099 | 11/1999 |
| WO | 2010037368 | 4/2010 |
| WO | 2014198268 | 12/2014 |

* cited by examiner

ARRANGEMENT AND METHOD FOR MEASURING A FORCE OR A TORQUE, WITH AT LEAST TWO MAGNETIC SENSORS SPACED APART FROM ONE ANOTHER

BACKGROUND

The present invention first relates to an arrangement for measuring a force and/or a torque using the inverse-magnetostrictive effect. The arrangement comprises at least two magnetic field sensors that are spaced apart as secondary sensors. The invention also relates to a method for measuring a force and/or a torque using the inverse-magnetostrictive effect.

EP 2 365 927 B1 shows a bottom bracket with two foot pedals and with a chain ring carrier that is connected to a shaft of the bottom bracket. The chain ring carrier is locked in rotation with a chain rig shaft that is, in turn, locked in rotation with the shaft. The chain ring shaft has, in some sections, a magnetization. A sensor is provided that detects a change in the magnetization for a torque present in the area of the magnetization.

U.S. Pat. No. 6,490,934 B2 discloses a magnetoelastic torque sensor for measuring a torque that acts on an element with a ferromagnetic, magnetostrictive, and magnetoelastic active area. This area is formed in a transducer that sits as a cylindrical sleeve, for example, on a shaft. The torque sensor is opposite the transducer.

From EP 0 803 053 B1, a torque sensor is known that comprises a magnetoelastic transducer. The transducer sits on a shaft as a cylindrical sleeve.

U.S. Pat. No. 8,893,562 B2 shows a method for detecting magnetic noise in a magnetoelastic torque sensor. The torque sensor comprises a torque converter with oppositely polarized magnetizations and multiple magnetic field sensors, wherein switching between these sensors is possible.

U.S. Pat. No. 8,578,794 B2 discloses a magnetoelastic torque sensor with a longitudinally extending element and with multiple magnetoelastic active regions, as well as with primary and secondary magnetic field sensors that are spaced apart axially.

From US 2014/0360285 A1, a magnetoelastic torque sensor is known that comprises a hollow, longitudinally extending element with multiple magnetoelastic active regions. In the hollow element there are primary and secondary magnetic field sensors.

US 2002/0162403 A1 shows a magnetoelastic torque sensor with a shaft in which a coil sits on a magnetoelastic area.

From U.S. Pat. No. 8,087,304 B2, a magnetoelastic torque sensor is known that comprises a longitudinally extending element with several magnetoelastic active regions. The torque sensor comprises primary and secondary magnetic field sensors that are connected as a Wheatstone bridge.

EP 2 799 827 A1 shows a magnetoelastic torque sensor with a hollow, longitudinally extending element that comprises several magnetoelastic active regions. In the hollow element are primary and secondary magnetic field sensors that are connected as a Wheatstone bridge.

SUMMARY

The objective of the present invention is to provide, starting from the prior art, the measurement of forces and/or torques based on the inverse-magnetostrictive effect can be realized in a way that is even less susceptible to interference.

The specified objective is achieved by an arrangement and also by a method having one or more features of the invention.

The arrangement according to the invention is used for measuring at least a force and/or a torque on a machine element. The at least one force or the at least one torque acts on the machine element, which leads to mechanical stress and usually slight deformation of the machine element. The machine element is used for transmitting the specified forces and torques.

The machine element has at least one magnetization area for a magnetization formed in the machine element. The one magnetization area or the multiple magnetization areas each form a primary sensor for determining the force or the torque. In so far as several of the magnetization areas are formed, these preferably have an equal spatial extent and are spaced apart. In an alternatively preferred way, the magnetization area can extend across the entire machine element.

The arrangement according to the invention further comprises at least two spaced apart magnetic field sensors that each form a secondary sensor for determining the force or the torque. The primary sensor, i.e., the one or more magnetization areas is used for converting the force to be measured or the torque to be measured into a corresponding magnetic field, while the secondary sensors allow the conversion of this magnetic field into electrical signals. The two or more magnetic field sensors are each formed for measuring a magnetic field or magnetic field change caused by the force and/or by the torque. The specified magnetic field occurs due to the inverse-magnetostrictive effect. Thus, the measurement possible with the arrangement according to the invention uses the inverse-magnetostrictive effect.

The arrangement according to the invention further comprises a measurement signal processing unit that is formed for the signal processing of the measurement signals of the individual magnetic field sensors. Thus, the measurement signals of the two or more magnetic field sensors can be processed separately. Through each of the two or more magnetic field sensors, at least one measurement signal can be output that can be processed individually by the measurement signal processing unit. The magnetic field sensors are preferably individually connected electrically to the measurement signal processing unit. Thus, the magnetic field sensors are not connected together, as is the case, for example, in a parallel connection, a series connection, or a Wheatstone bridge. Within the arrangement according to the invention, an absolute measurement of the mentioned magnetic field with each of the magnetic field sensors is possible.

One particular advantage of the arrangement according to the invention is provided in that the signals of the two or more magnetic field sensors can be processed in a variable manner, in order, for example, to be able to measure and eliminate certain interference effects in the measurement using the inverse-magnetostrictive effect. It also makes possible an indirect improvement to the signal-to-noise ratio and a reduction of the failure rate.

Preferably, each of the two or more magnetic field sensors has an electrical or logical connection that is guided individually to the measurement signal processing unit. Consequently, the signals of the two or more magnetic field sensors can be processed individually. The electrical connection is preferably formed by a connection cable. The logical connection is preferably formed within a bus. The connection can be formed for analog or for digital signal transmission.

The magnetic field sensors can be redundant, i.e., there can be several of the magnetic field sensors for measuring the same component or the same property of the magnetic field caused by the magnetization and also by the force and/or by the torque.

The machine element extends preferably along an axis. The axis preferably forms a rotational axis of the machine element. The machine element can preferably rotate about the axis. The directions indicated below, namely the axial direction, the radial direction, and the tangential direction, are with respect to the specified axis.

The arrangement according to the invention preferably comprises at least four, further preferred at least six, and even more preferred at least eight of the magnetic field sensors. The higher the number of magnetic field sensors, the better interference effects can be eliminated.

For preferred embodiments of the arrangement according to the invention, the magnetic field sensors are arranged equidistant, for which at least three of the magnetic field sensors must be present. In other preferred embodiments of the arrangement according to the invention, the two or more magnetic field sensors are arranged equiangular with respect to the axis, i.e., the angular distances between two adjacent magnetic field sensors are equal. If more than three of the magnetic field sensors are present, preferably at least the magnetic field sensors of sub-sets of the several magnetic field sensors are arranged equidistant, so that the magnetic field sensors are arranged equidistant in groups. If more than two of the magnetic field sensors are present, preferably at least the magnetic field sensors of sub-sets of the several magnetic field sensors are arranged equiangular, so that the magnetic field sensors are arranged equiangular in groups.

In preferred embodiments of the arrangement according to the invention, the magnetic field sensors have an equal distance to the axis. If more than two of the magnetic field sensors are present, preferably at least the magnetic field sensors of sub-sets of the several magnetic field sensors have an equal distance to the axis.

In preferred embodiments of the arrangement according to the invention, some of the magnetic field sensors are arranged on the axis.

The magnetic field sensors are preferably arranged in the form of a matrix, wherein the matrix can be formed in Cartesian coordinates or also in polar coordinates.

If more than two of the magnetic field sensors are present, these are preferably arranged in a plane. If more than three of the magnetic field sensors are present, preferably at least the magnetic field sensors of sub-sets of the several magnetic field sensors are arranged in a plane, so that the magnetic field sensors are each arranged in a plane in groups.

The two or more magnetic field sensors are preferably arranged in a plane that is oriented parallel or perpendicular to the axis. If more than two of the magnetic field sensors are present, preferably at least the magnetic field sensors of sub-sets of the multiple magnetic field sensors are arranged in a plane that is oriented parallel or perpendicular to the axis.

The two or more magnetic field sensors are preferably arranged in rows and/or columns. The rows and/or columns are preferably arranged perpendicular or parallel to the axis.

The two or more magnetic field sensors are preferably arranged on equiangular radii with respect to the axis. On each radius there is preferably a sub-set of the magnetic field sensors that are arranged equally spaced at the respective radius.

In preferred embodiments of the arrangement according to the invention, the two or more magnetic field sensors are each formed for the individual measurement of exactly one directional component of the magnetic field caused by the force and/or by the torque. This directional component is preferably the axial, radial, or tangential directional component.

In other preferred embodiments of the arrangement according to the invention, the two or more magnetic field sensors are each formed for the individual measurement of multiple directional components of the magnetic field caused by the magnetization and also by the force and/or by the torque. These directional components are preferably axial, radial, and/or tangential directional components.

In especially preferred embodiments of the arrangement according to the invention, the two or more magnetic field sensors are each formed for the individual measurement of three directional components of the magnetic field caused by the magnetization and also by the force and/or the torque. These three directional components are preferably the axial, radial, and tangential directional components. At a minimum, preferably several of the magnetic field sensors are each formed for the individual measurement of three directional components of the magnetic field caused by the magnetization and also by the force and/or the torque.

In other preferred embodiments of the arrangement according to the invention, at least one of the magnetic field sensors is further formed for measuring an interference magnetic field and/or a magnetic field of the magnetization of the machine element. In this way the influence of the interference magnetic field can be measured directly and over time, so that this can be eliminated in the measurement of the magnetic field caused by the magnetization and also by the force and/or the torque.

Other preferred embodiments of the arrangement according to the invention comprise additional magnetic field sensors for measuring the interference magnetic field and/or the magnetic field of the magnetization of the machine element.

Other preferred embodiments of the arrangement according to the invention comprise temperature sensors on the magnetic field sensors for measuring the temperature given there. The temperature sensors are preferably likewise connected electrically to the measurement signal processing unit. The measurement signal processing unit is preferably configured to compensate for the influence of the temperature on the measurement signals of the magnetic field sensors.

In preferred embodiments of the arrangement according to the invention, the machine element has a hollow space, so that the machine element is hollow. The hollow space preferably extends at least partially about the axis. The hollow space is formed, in particular, in the area of the axis. Preferably the hollow space extends across the entire axial length of the machine element. The hollow space is preferably open on an axial end. It preferably has the shape of a cylinder.

The two or more magnetic field sensors are preferably arranged in the hollow space of the machine element. There, the magnetic field sensors are largely protected from external influences. The two or more magnetic field sensors can also be arranged outside of the machine element.

The one magnetization area or the multiple magnetization areas can be magnetized permanently or temporarily. In preferred embodiments of the arrangement according to the invention, the one magnetization area or the multiple magnetization areas are magnetized permanently, so that the magnetization is formed by a permanent magnetization. In alternatively preferred embodiments of the arrangement according to the invention, this further has at least one magnet for the magnetization of the one or more magnetization areas, so that the magnetization of the one or more magnetization areas is basically temporary. The one or more magnets can be formed by a permanent magnet or preferably by an electromagnet.

The one permanently or temporarily magnetized magnetization area or the multiple permanently or temporarily magnetized magnetization areas are preferably magnetically neutral in a state of the machine element that is unloaded by a force or by a torque toward the outside of the respective magnetization area, so that no technically relevant magnetic field can be measured outside of the respective magnetization area.

The one magnetization area or the multiple magnetization areas each represent a part of the volume of the machine element. The one magnetization area or the multiple magnetization areas are preferably each formed with a ring-like shape, wherein the axis of the machine element also forms a middle axis of the respective ring shape. In an especially preferred way, the one magnetization area or the multiple magnetization areas each have the shape of a hollow cylinder that is coaxial to the axis of the machine element.

The one or more magnetization areas extend preferably circumferentially about the axis and can therefore also be considered a magnetization track. This is at least one magnetization area surrounding the axis, wherein the axis itself preferably does not form a part of the magnetization area. The one magnetization area or the multiple magnetization areas preferably have a tangential orientation with respect to a surface of the machine element extending about the axis. The one magnetization area or the multiple magnetization areas preferably have only one tangential orientation with respect to a surface of the machine element extending about the axis. The one magnetization area or the multiple magnetization areas preferably each extend along a closed path about the axis, wherein the magnetization area or the magnetization areas may have short gaps. In so far as multiple magnetization areas are formed, these preferably have an equal spatial extent and are spaced apart axially. In so far as multiple of the magnetization areas, these preferably have opposite polarities. In an especially preferred way, at least two of the circumferentially extending magnetization areas are constructed in the form of magnetization tracks.

The machine element is formed of a magnetostrictive or magnetoelastic material at least in the magnetization area. Preferably, the machine element is formed completely from the magnetostrictive or magnetoelastic material. Preferably, the machine element is a steel.

The machine element preferably has the outer shape of a prism or a cylinder, wherein the prism or the cylinder are arranged preferably coaxial to the axis. The prism or the cylinder is preferably straight. In an especially preferred way, the machine element has the outer shape of a straight circular cylinder, wherein the circle cylinder is arranged preferably coaxial to the axis. In special embodiments, the prism or the cylinder has a conical construction.

The machine element has, in an especially preferred way, the shape of a hollow cylinder.

The machine element is preferably formed by a shaft, a partially hollow shaft, a hollow shaft, a flange, or a hollow flange. The shaft, the partially hollow shaft, the hollow shaft, the flange, or the hollow flange can be designed for loads by different forces and torques and can be, for example, a component of a sensor bottom bracket, a roll stabilizer, or a fertilizer spreader. In principle, the machine element can also be formed by completely different machine element types, e.g., a shift fork.

The two or more magnetic field sensors are each preferably formed by a semiconductor sensor. The two or more magnetic field sensors are formed in an alternatively preferred way by an MR sensor, a Hall sensor, a field plate, a SQUID, a coil element, a flux gate, or a flux gate magnetometer. In principle, other sensor types could also be used, as long as they are suitable for measuring the magnetic field caused by the inverse-magnetostrictive effect or one or more directional components of this magnetic field. Preferably, the magnetic field sensors are formed by different sensor types, wherein optimal changes to the machine element and to the magnetization area can be guaranteed.

The measurement signal processing unit is preferably formed by a microcontroller. In another sense, the measurement signal processing unit is preferably formed by a computational unit.

The measurement signal processing unit is preferably further formed for evaluating the measurement signals of the individual magnetic field sensors. This not only enables preprocessing of the measurement signals of the individual magnetic field sensors, but the measurement signal processing unit also enables the output of evaluated measurement results, e.g., the output of a vector specification of a magnetic flux density of the magnetic field caused by the magnetization and also by the force and/or by the torque, in which an interference field was eliminated. The measurement signal processing unit also preferably enables the output of the values of the force to be measured or the torque to be measured.

The measurement signal processing unit preferably comprises a memory for sensor data. This sensor data forms an information database for the interpretation of the measurement signals of the magnetic field sensors.

In preferred embodiments of the arrangement according to the invention, the measurement signal processing unit is formed to evaluate the measurement signals of groups of magnetic field sensors, wherein the grouping of the magnetic field sensors can be changed. Thus, the magnetic field sensors can be grouped in different ways to be able measure, for example, different components of the magnetic field caused by magnetization and also by the force and/or the torque or also interference magnetic fields. Thus, e.g., the measurement of interference magnetic fields can take place virtually simultaneously.

The method according to the invention is used for measuring a force and/or a torque on a machine element using the inverse-magnetostrictive effect. The machine element has at least one magnetization area for a magnetization. According to the method, at least two spaced apart magnetic field sensors are used for measuring a magnetic field caused by the magnetization and also by the force and/or by the torque. According to the invention, the measurement signals of the two or more magnetic field sensors are processed individually.

The method according to the invention preferably also has the steps and features that are described in connection with the arrangement according to the invention.

In preferred embodiments of the method according to the invention, a plausibility check of the measurement signals of the individual magnetic field sensors is performed. This is possible, in particular, if the number of magnetic field sensors is significantly greater than two, so that the magnetic field is measured multiple times redundantly.

In preferred embodiments of the method according to the invention, an external magnetic field is detected and the influence of this external magnetic field on the measurement of the acting force or the acting torque is compensated for.

The external magnetic field can be formed by a near field or by a far field. The near field is an inhomogeneous magnetic field on the arrangement of the magnetic field sensors. The field distribution of a near field within the arrangement of the magnetic field sensors can be detected, because each of the magnetic field sensors preferably also provides the direction of the individual vector and the magnitudes of the measured magnetic field directional components. In this way, a direction, a distribution, and an intensity of the external magnetic field can be detected. However, a type of external magnetic field, i.e., a permanent magnetization or a time change of the interference effect, e.g., a weakening or a migration of the interference source, can be detected. The form of interference, i.e., point-wise or wide area, can also be detected. Likewise, an electrical field can be detected that transitions into a magnetic field. The near field is preferably measured and compensated for in the measurement of the force or the torque.

The far field generates an offset of the magnetic field in a vector direction across the entire arrangement of the magnetic field sensors. A magnitude and a direction of this offset can be detected. Preferably, the far field and the linear near field are measured and compensated at the same time as the measurement of the force or the torque. A non-linear component of the near field is preferably detected, in order to compensate for it.

Preferably multiple directions of the magnetic field are measured with each of the magnetic field sensors. Starting from this, preferably also a bending of the machine element is determined. This bending is preferably a torsion about two axes perpendicular to the axis of the machine element. Preferably a direction and a magnitude of the bending are determined. Furthermore, preferably a transverse force is determined. The transverse force is constructed perpendicular to the axis of the machine element. Preferably a direction and a magnitude of the transverse of the transverse force are determined. Preferably other torques and/or forces are determined.

Another preferred interference magnetic field to be determined is caused by a temperature gradient on the machine element. This temperature gradient can occur, for example, when the machine element is 120° C. hot and splashed water or ice water with a temperature of approximately 0° C. comes in contact with the machine element. If cold water contacts the hot machine element, this cools at the contact position. The cooling progresses around the contact area of the water. At the same time, the rest of the machine element, especially the opposite area of the machine element, continues to be hot. The temperature difference between the temperature extremes on the periphery of the machine element then equals, for example, 120° K. These temperature differences cause inhomogeneous thermal expansion in the machine element as a function of the temperature distribution. The inhomogeneous expansion causes material stress in the machine element, for which the inverse-magnetostrictive effect is sensitive, so that an interference magnetic field results. This interference magnetic field is preferably detected and compensated by the individual processing of the measurement signals of the magnetic field sensors. Preferably, the temperatures on the magnetic field sensors are also measured, in order to compensate a temperature range of the magnetic field sensors, so that also for other temperatures than room temperature, the magnetic field can be measured with high accuracy. Furthermore, this temperature information is preferably used as an indicator for temperature gradients in the machine element. If the temperature distribution in the machine element is known, its influence can be compensated. The temperature measurement is preferably performed at the same measurement frequency as the measurement of the magnetic field.

The measurement signal processing unit of the arrangement according to the invention is preferably configured for performing the described method steps.

BRIEF DESCRIPTION OF THE DRAWINGS

Additional details, advantages, and refinements of the invention are given from the following description of preferred embodiments of the invention, with reference to the drawing. Shown are.

DETAILED DESCRIPTION

Figure 1:
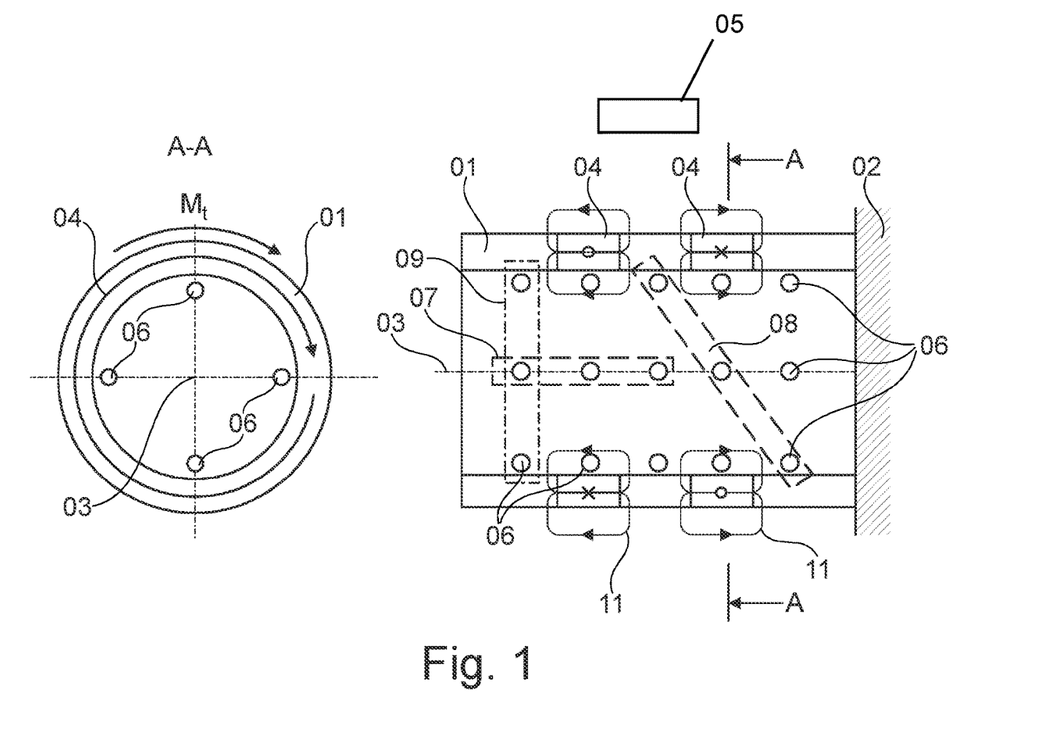
FIG. 1 A first preferred embodiment of an arrangement according to the invention in two views.

FIG. 1 shows a first preferred embodiment of an arrangement according to the invention in a cross-sectional view and in a longitudinal section view. The arrangement comprises a machine element made from a steel in the form of a hollow flange 01 that is mounted on a base body 02 and extends in an axis 03. A torque $M_t$ that can be measured with the arrangement according to the invention acts on the hollow flange 01.

The hollow flange 01 has two magnetization areas 04 in the form of surrounding tracks. The two magnetization areas 04 are permanently magnetized and oppositely poled. The two magnetization areas 04 form a primary sensor for measuring the torque $M_t$ using the inverse-magnetostrictive effect.

The arrangement further comprises twenty magnetic field sensors 06 located in the interior of the hollow flange 01. The twenty magnetic field sensors 06 have an equal distance to the axis 03. The twenty magnetic field sensors 06 are arranged in the form of five groups. Each of the five groups comprises four of the magnetic field sensors 06 that are arranged at an angular distance of 90° with respect to the axis 03 and together in a plane arranged perpendicular to the axis 03. The five groups are arranged equidistant with respect to the axis 03. Only two of the five groups of magnetic field sensors 06 are arranged at an axial position at which one of the two magnetization areas 04 is also arranged. The arrangement of the twenty magnetic field sensors 06 can alternatively also be described in that they are arranged in the form of four groups. Each of the four groups comprises five of the magnetic field sensors 06 that lie together on a straight line arranged parallel to the axis 03 and are arranged equidistant. The arrangement of the twenty magnetic field sensors 06 can alternatively also be described in that they are arranged in the form of two groups. Each of the two groups comprises ten of the magnetic field sensors 06 that are arranged together in a plane surrounding the axis 03 in a matrix-like pattern, wherein the two planes have an angle of 90° to each other.

The described arrangement of the twenty magnetic field sensors 06 leads, among other things, to a group 07 of magnetic field sensors 06 oriented in the axial direction, a group 08 of magnetic field sensors 06 oriented in the diagonal direction, and a group 09 of magnetic field sensors 06 oriented in the tangential direction.

The twenty magnetic field sensors 06 are each shown symbolically by a circle.

The twenty magnetic field sensors 06 each permit a measurement of one or more of the directional components of a magnetic field 11 and also possible interference magnetic fields occurring due to the inverse-magnetostrictive effect.

Each of the twenty magnetic field sensors 06 is connected individually to a microcontroller acting as a measurement signal processing unit 05, shown schematically in FIG. 1, so that the micro-controller can process and evaluate the measurement signals of the twenty magnetic field sensors 06 individually or in variable groups.

The microcontroller controls the polling of the twenty magnetic field sensors 06 and compares their measurement values with a database that is stored in the microcontroller and calculates relative or absolute measurement values and compares them with each other.

In so far as the twenty magnetic field sensors 06 are each formed for measuring all three directional components of the magnetic field 11 occurring due to the inverse-magnetostrictive effect, a spatial vector is measured with the magnitude and direction of the load-dependent magnetic field 11 to be measured. The spatial vector that can be illustrated by the magnetic flux density with the three directional components $B_x$, $B_y$ and $B_z$ is formed from the measurement values of the magnetic field sensors 06.

The magnetic field 11 produced due to the inverse-magnetostrictive effect is dependent on the torque $M_t$. Indeed, if necessary, only a few of the twenty magnetic field sensors 06 of this magnetic field 11 can detect, but these magnetic field sensors 06 can be selected and grouped by the microcontroller.

For changing, pure torsion loading of the hollow flange 01 and for a disappearing interference field, at each of the positions of the magnetic field sensors 06, the vector of the magnetic flux density changes only in magnitude, i.e., each of the magnetic field sensors 06 undergoes a change in the vector magnitude, but not in the vector direction. Thus, the magnitude of the magnetic flux density of each vector component $B_x$, $B_y$ and $B_z$ increases equally, so that the vector direction remains unchanged.

The magnetic flux density of the load-dependent magnetic field 11 is linearly dependent for each of the three vector components $B_x$, $B_y$ and $B_z$ on the torque $M_t$, wherein the linear increase is negative or positive as a function of the position of each magnetic field sensor 06 in the axial direction. A slope of zero for one or two of the three vector components is also conceivable.

The load-dependent magnetic field 11 that is measured using the vector of the magnetic flux density $B_x$, $B_y$ and $B_z$ differs at the positions of the individual magnetic field sensors 06 for a constant torque load. Under the assumption of a disappearing small interference magnetic field, the direction and the magnitude of the vector are equal at each magnetic field sensor 06 with an equal axial position. Accordingly, the direction and the magnitude of the vector differ between the positions of the magnetic field sensors 06 within the axial direction. This relationship offers the ability to combine measurement signals of individual magnetic field sensors 06 into groups and to evaluate them accordingly.

Figure 2:
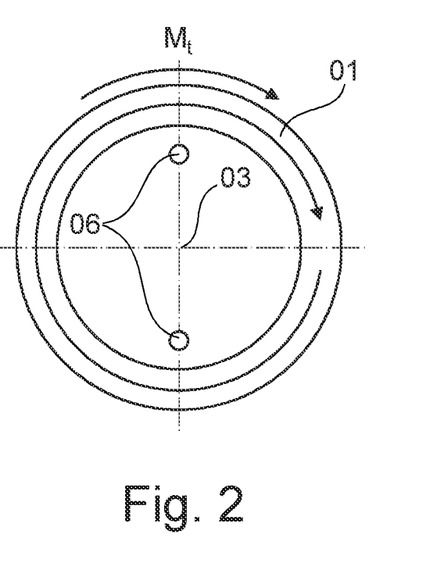
FIG. 2 A second preferred embodiment of the arrangement according to the invention in a cross-sectional view.

FIG. 2 shows a second preferred embodiment of the arrangement according to the invention in a cross-sectional view. This embodiment is initially identical to the embodiment shown in FIG. 1. In contrast to the embodiment shown in FIG. 1, the magnetic field sensors 06 are arranged together in a plane surrounding the axis 03. The magnetic field sensors 06 are arranged in two groups. Each of the two groups comprises several of the magnetic field sensors 06 that are arranged together on a straight line arranged parallel to the axis 03 and equidistant. The magnetic field sensors 06 have an equal distance to the axis 03.

Figure 3:
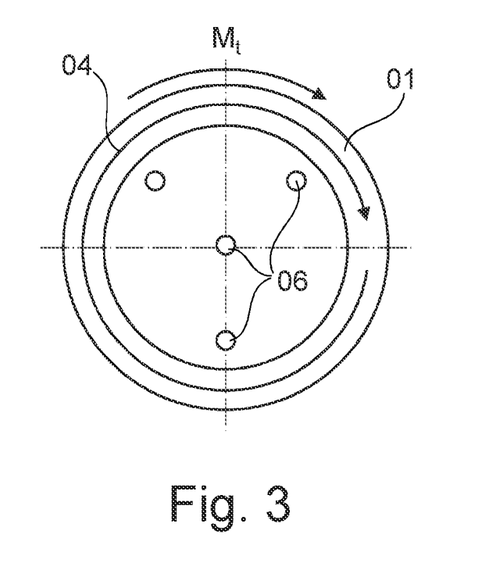
FIG. 3 A third preferred embodiment of the arrangement according to the invention in a cross-sectional view.

FIG. 3 shows a third preferred embodiment of the arrangement according to the invention in a cross-sectional view. This embodiment is initially identical to the embodiment shown in FIG. 2. In contrast to the embodiment shown in FIG. 2, the magnetic field sensors 06 are arranged in different positions about the axis 03 and also in the axis 03. The magnetic field sensors 06 are arranged in four groups. Each of the four groups comprises several of the magnetic field sensors 06 that are arranged together on a straight line arranged parallel to the axis 03 or on the axis 03 and equidistant. The magnetic field sensors 06 not arranged in the axis 03 have an equal distance to the axis 03.

Figure 4:
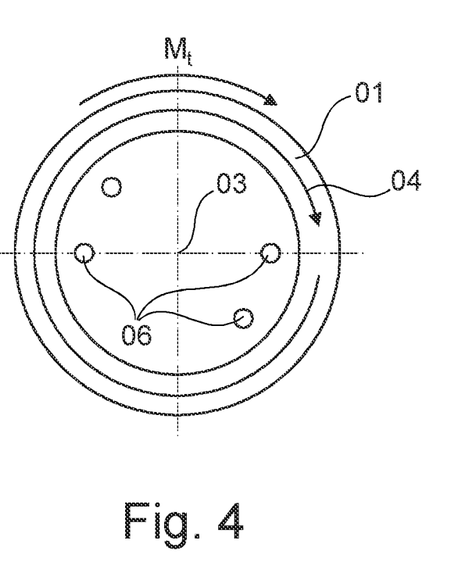
FIG. 4 A fourth preferred embodiment of the arrangement according to the invention in a cross-sectional view.

FIG. 4 shows a fourth preferred embodiment of the arrangement according to the invention in a cross-sectional view. This embodiment is initially identical to the embodiment shown in FIG. 2. In contrast to the embodiment shown in FIG. 2, the magnetic field sensors 06 are arranged in two planes encompassing the axis 03. These two planes have an angle of 45° to each other.

Figure 5:
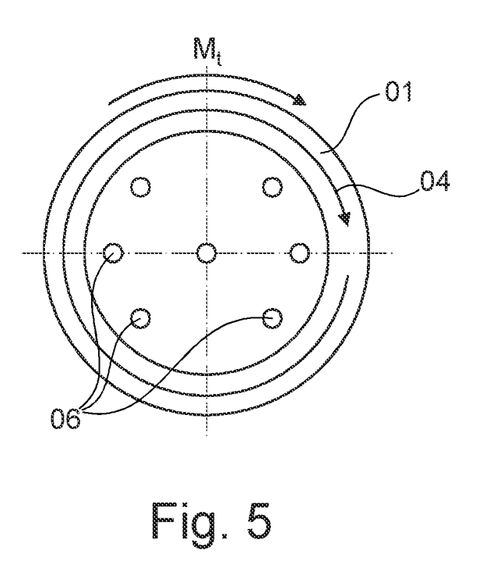
FIG. 5 A fifth preferred embodiment of the arrangement according to the invention in a cross-sectional view.

FIG. 5 shows a fifth preferred embodiment of the arrangement according to the invention in a cross-sectional view. This embodiment is initially identical to the embodiment shown in FIG. 3. In contrast to the embodiment shown in FIG. 3, the magnetic field sensors 06 are arranged in seven groups. Each of the seven groups comprises several of the magnetic field sensors 06 that are arranged together on a straight line arranged parallel to the axis 03 or on the axis 03 and equidistant.

Figure 6:
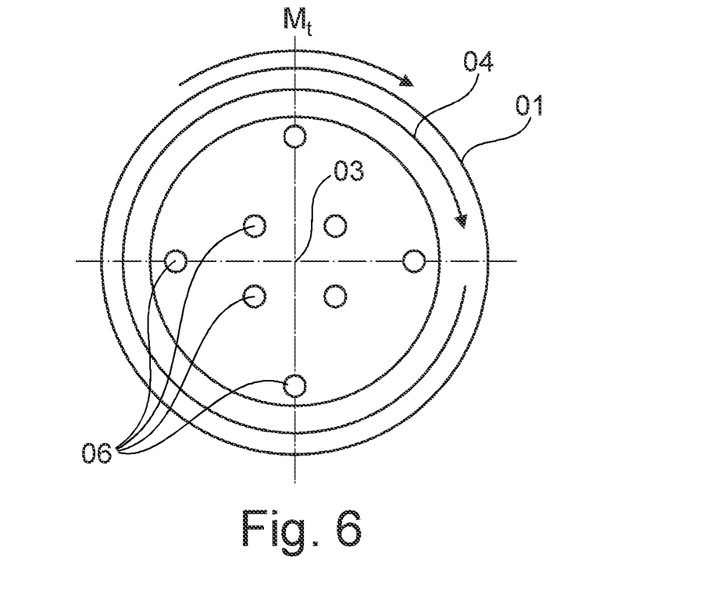
FIG. 6 A sixth preferred embodiment of the arrangement according to the invention in a cross-sectional view.

FIG. 6 shows a sixth preferred embodiment of the arrangement according to the invention in a cross-sectional view. This embodiment is initially identical to the embodiment shown in FIG. 2. In contrast to the embodiment shown in FIG. 2, the magnetic field sensors 06 are arranged in eight groups. Each of the eight groups comprises several of the magnetic field sensors 06 that are arranged together on a straight line arranged parallel to the axis 03 and equidistant. The straight lines of each of four of the eight groups have an angular distance of 90° with respect to the axis 03. The magnetic field sensors 06 of each of four of the eight groups have an equal distance to the axis 03.

Figure 7:
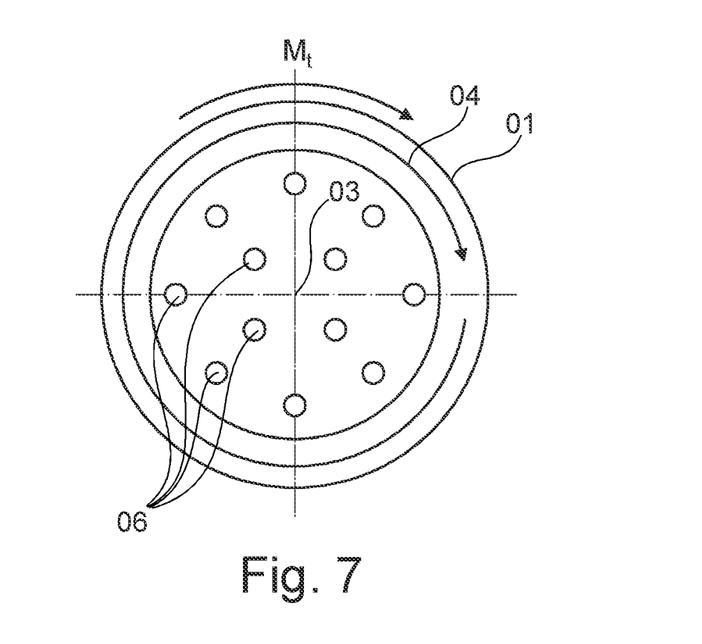
FIG. 7 A seventh preferred embodiment of the arrangement according to the invention in a cross-sectional view.

FIG. 7 shows a seventh preferred embodiment of the arrangement according to the invention in a cross-sectional view. This embodiment is initially identical to the embodiment shown in FIG. 6. In contrast to the embodiment shown in FIG. 6, the magnetic field sensors 06 are arranged in twelve groups. Eight of the twelve groups of magnetic field sensors 06 are arranged on eight straight lines that have an angular distance of 45° with respect to the axis 03 and an equal distance to the axis 03. The remaining four groups of the twelve groups of magnetic field sensors 06 are arranged on four straight lines that have an angular distance of 90° with respect to the axis 03 and an equal distance to the axis 03.

Figure 8:
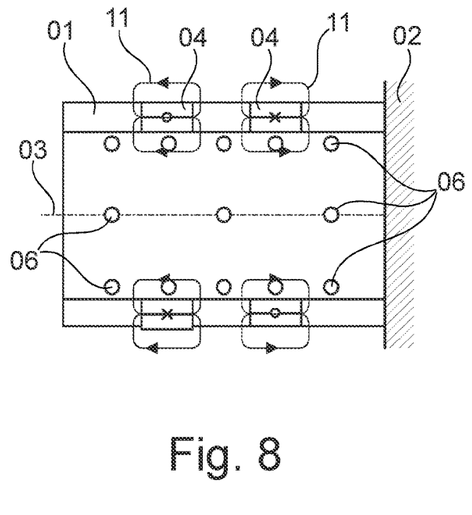
FIG. 8 An eighth preferred embodiment of the arrangement according to the invention in a longitudinal section view.

FIG. 8 shows an eighth preferred embodiment of the arrangement according to the invention in a longitudinal section view. This embodiment is initially identical to the embodiment shown in FIG. 1. In contrast to the embodiment shown in FIG. 1, four of the magnetic field sensors 06 are missing, namely in two of the four groups of magnetic field sensors 06 arranged on straight lines. The magnetic field sensors 06 that have an identical axial position as the magnetization areas 04 are missing.

Figure 9:
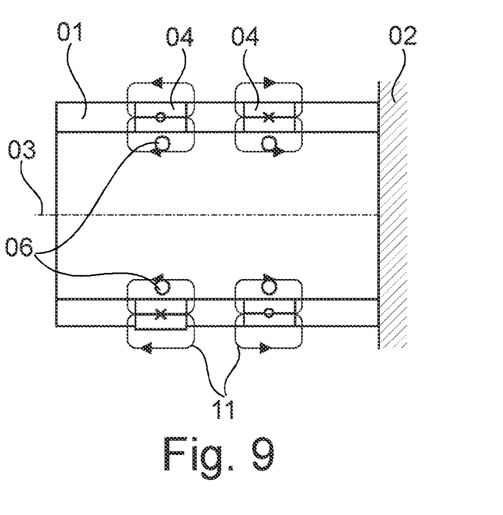
FIG. 9 A ninth preferred embodiment of the arrangement according to the invention in a longitudinal section view.

FIG. 9 shows a ninth preferred embodiment of the arrangement according to the invention in a longitudinal section view. This embodiment is initially identical to the embodiment shown in FIG. 8. In contrast to the embodiment shown in FIG. 8, a different twelve sensors of the magnetic field sensors 06 are missing, namely those that do not have an identical position as the magnetization areas 04.

Figure 10:
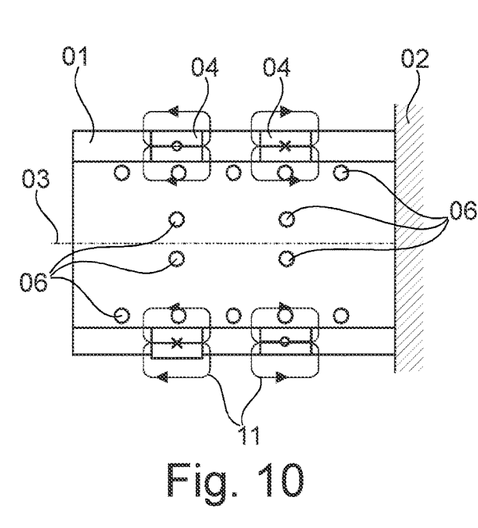
FIG. 10 A tenth preferred embodiment of the arrangement according to the invention in a longitudinal section view.

FIG. 10 shows a tenth preferred embodiment of the arrangement according to the invention in a longitudinal section view. This embodiment is initially identical to the embodiment shown in FIG. 8. In contrast to the embodiment shown in FIG. 8, in two of the four groups of magnetic field sensors 06 arranged on straight lines, those magnetic field sensors 06 that do not have an identical axial position as the magnetization areas are missing. Instead, at the axial positions of the magnetization areas 04, each of four additional magnetic field sensors 06 are arranged with a smaller distance to the axis 03.

Figure 11:
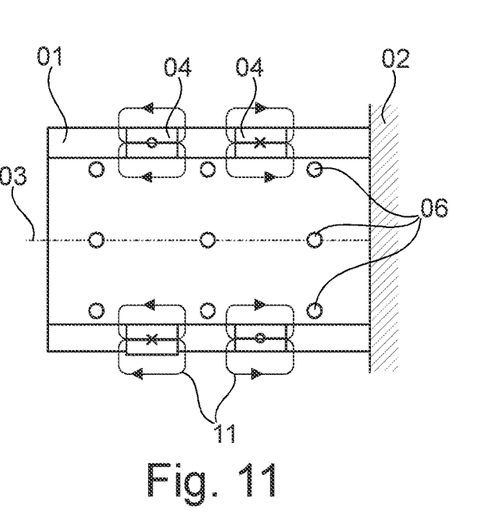
FIG. 11 An eleventh preferred embodiment of the arrangement according to the invention in a longitudinal section view.

FIG. 11 shows an eleventh preferred embodiment of the arrangement according to the invention in a longitudinal section view. This embodiment is initially identical to the embodiment shown in FIG. 8. In contrast to the embodiment shown in FIG. 8, the magnetic field sensors 06 that have an identical axial position as the magnetization areas 04 are missing.

The arrangements of the magnetic field sensors 06 of the embodiments shown in FIGS. 2 to 11 can be combined in the axial direction. For example, the arrangement shown in FIG. 2 can be combined with the arrangement shown in FIG. 9.

The arrangements shown in FIGS. 2 to 11 of the magnetic field sensors 06 enable both a detection of the load-dependent magnetic field 11 and also a detection of a possible interference magnetic field. In particular, it is also possible to determine the intensity and/or the direction of the interference magnetic field. With special calculation types of the measurement signals of the magnetic field sensors 06 and a database stored accordingly in the microcontroller, an interpretation of the measurement and thus the detection of different interference cases and results is possible.

Figure 12:
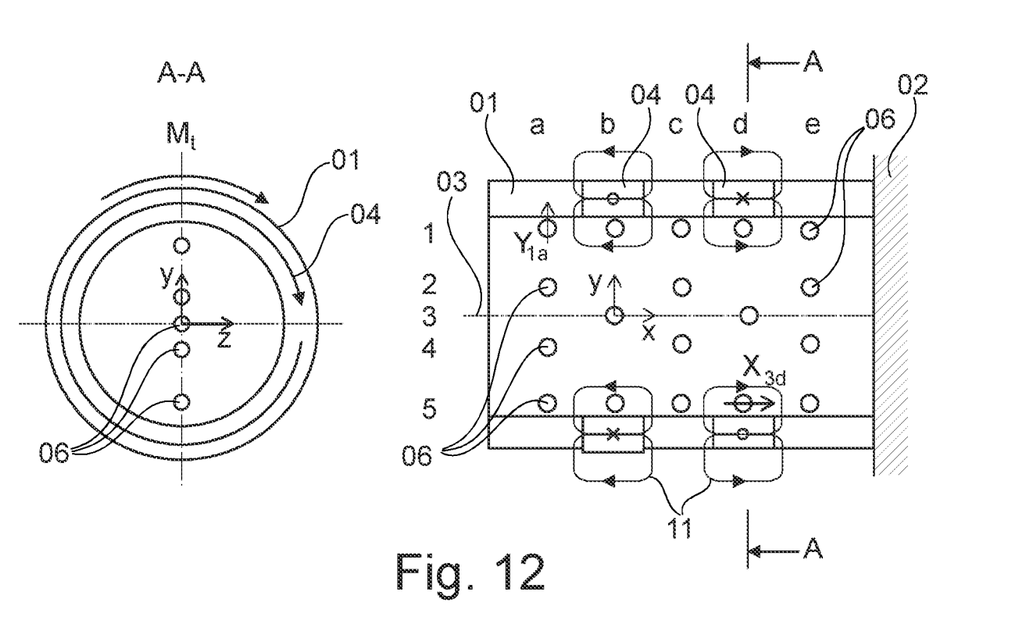
FIG. 12 A twelfth preferred embodiment of the arrangement according to the invention in two views.

FIG. 12 shows a twelfth preferred embodiment of the arrangement according to the invention in a cross-sectional view and in a longitudinal section view. This embodiment is initially identical to the embodiment shown in FIG. 1. In contrast to the embodiment shown in FIG. 1, all of the magnetic field sensors 06 are arranged in a plane that encompasses the axis 03. The magnetic field sensors 06 are arranged in the form of a matrix in the x and y directions, wherein the axis 03 is in the x-direction. The matrix comprises rows 1, 2, 3, 4, 5 and columns a, b, c, d, e. Each of the matrix elements (1a) to (5e), with the exception of matrix elements (2b), (2d), (3a), (3c), (3e), (4b) and (4d), is provided with one of the magnetic field sensors 06.

The rows 1 and 5 are arranged closest to the inner wall of the hollow flange 01. The distance between the rows 1 and 5 is D. Consequently, the y-coordinate of row 1 is D/2. The y-coordinate of row 5 is −D/2. The y-coordinate of row 2 is D/6. The y-coordinate of row 4 is −D/6. The y-coordinate of row 3 is zero. The magnetic field sensors 06 in rows 1 and 5 are used mainly for measuring $M_t$, while the magnetic field sensors 06 in rows 2 to 4 are used mainly for measuring the interference magnetic field.

The load-dependent magnetic field 11 is proportional to the torque $M_t$. It can be calculated redundantly as $M_{t\_a}$, $M_{t\_b}$, $M_{t\_c}$, $M_{t\_d}$ and $M_{t\_e}$ as follows:

$$M_{t\_a}=[Y_{1a}-3Y_{2a}+3Y_{4a}-Y_{5a}]\cdot K_1$$

$$M_{t\_c}=[-Y_{1c}+3Y_{2c}-3Y_{4c}+Y_{5c}]\cdot K_2$$

$$M_{t\_e}=[Y_{1e}-3Y_{2e}+3Y_{4e}-Y_{5e}]\cdot K_3$$

$$M_{t\_b}=[-X_{1b}+2X_{3b}-X_{5b}]\cdot K_4$$

$$M_{t\_d}=[X_{1d}-2X_{3d}+X_{5d}]\cdot K_5$$

In these formulas, X and Y stand for the respective magnetic field component measured with the magnetic field sensor 06 indicated in the index in the x or y direction. The constants $K_1$ to $K_5$ are determined by calibration. It is to be expected that the relationships $K_1 \neq K_3 \approx K_2/2$ and $K_4 \neq K_5$ are set.

The terms $M_{t\_a}$ to $M_{t\_e}$ allocate the magnetic field 11 into the columns a to e with reference to different magnetic field spatial components. Depending on the axial position on the hollow flange 01, two different term structures are produced. A largely complete compensation of interference with reference to the terms is achieved at the same time as the measurement of the torque $M_t$.

By comparing $M_{t\_a}$, $M_{t\_b}$, $M_{t\_c}$, $M_{t\_d}$ and $M_{t\_e}$, a plausibility check is performed. If the values $M_{t\_a}$, $M_{t\_b}$, $M_{t\_c}$, $M_{t\_d}$ and $M_{t\_e}$ are equal in consideration of a permissible tolerance, then the plausibility check is successful and the measured value can be further processes as a value for $M_t$. The parameters can move in the permissible tolerance range. The permissible size of the tolerance range is defined in advance and stored in the algorithm.

The terms $M_{t\_a}$, $M_{t\_b}$, $M_{t\_c}$, $M_{t\_d}$ and $M_{t\_e}$ include the compensation of a far field. Likewise, a compensation of a near field that is linearly variable in the plane spanned by the magnetic field sensors 06 takes place in the measured field direction. For a non-linear near field, the linear component of the near field is compensated. The larger the linear component is, the better the compensation of the interference.

In addition, these terms include a compensation of possible transverse forces in the y direction or in a z direction. These terms also include a compensation of possible transverse forces that are caused by possible bending moments in the z direction or in the y direction. The mentioned compensation takes place virtually at the same time as the measurement.

The non-linear component of a near field can be handled using a computational approach. Here, the non-linear component of the near field is defined using the available measured values including directional components of the individual magnetic field sensors 06. Furthermore, a conclusion can be made using the nonlinear component of the near field on the measurement errors caused by this component on the magnetic field sensors 06, including directional components or on the measurement error of groups of magnetic field sensors 06. Starting from this, the measured values of the groups of magnetic field sensors 06 are corrected and thus an increase in the accuracy of the measurement that can be performed with the arrangement according to the invention.

LIST OF REFERENCE SYMBOLS

01 Machine element in the form of a hollow flange
02 Base body
03 Axis
04 Magnetization area
05 -
06 Magnetic field sensor
07 Group in axial direction
08 Group in diagonal direction
09 Group in tangential direction
10 -
11 Magnetic field

The invention claimed is:

1. An arrangement for measuring at least one of a force or a torque on a rotatable hollow shaft, which has at least one magnetization area for a magnetization; the arrangement comprises:
at least three individual magnetic field sensors that are arranged inside of the rotatable hollow shaft and spaced apart for measuring a magnetic field caused by the magnetization and by the at least one of the force or the torque; and
a measurement signal processing unit to process signals of the individual magnetic field sensors,
wherein each of the magnetic field sensors has an electrical or logical connection that is guided individually to the measurement signal processing unit, such that signals from the magnetic field sensors are processed individually by the measurement signal processing unit.

2. The arrangement according to claim 1, wherein the magnetic field sensors are arranged equidistant or equiangular at least in groups.

3. The arrangement according to claim 1, wherein the magnetic field sensors are arranged in a plane at least group by group.

4. The arrangement according to claim 1, wherein the magnetic field sensors are each constructed for individual measurement of three directional components of the magnetic field caused by the magnetization and also by the at least one of the force or the torque.

5. The arrangement according to claim 1, wherein at least one of the magnetic field sensors is further constructed for measuring an interference magnetic field.

6. The arrangement according to claim 1, wherein the measurement signal processing unit is constructed to evaluate the measurement signals of groups of the magnetic field sensors, and the magnetic field sensors assigned to the groups of the magnetic field sensors is changeable.

7. The arrangement according to claim 1, wherein the magnetic field sensors are not connected together.

8. An arrangement for measuring at least one of a force or a torque on a rotatable hollow shaft, which has at least one magnetization area for a magnetization, the arrangement comprises:
a first set of at least three individual magnetic field sensors and a second set of at least three individual magnetic field sensors, the magnetic field sensors being spaced apart for measuring a magnetic field caused by the magnetization and by the at least one of the force or the torque, wherein two or more of the magnetic field sensors are arranged within the rotatable hollow shaft,
the first set being arranged in a radially extending plane through the rotatable hollow shaft and the second set being arranged in an axially extending plane through the rotatable hollow shaft; and
a measurement signal processing unit to process signals of the individual magnetic field sensors,
wherein each of the magnetic field sensors has an electrical or logical connection that is guided individually to the measurement signal processing unit, such that signals from the magnetic field sensors are processed individually by the measurement signal processing unit.

9. The arrangement according to claim 8, wherein the magnetic field sensors are arranged in a matrix.

10. The arrangement of claim 8, wherein at least one magnetic field sensor is common to both the first and second sets.

11. An arrangement for measuring at least one of a force or a torque on a rotatable hollow shaft, which has at least one magnetization area for a magnetization, the arrangement comprises:
at least twelve magnetic field sensors for measuring a magnetic field caused by the magnetization and by the at least one of the force or the torque, wherein two or more sensors of the at least twelve magnetic field sensors are arranged within the rotatable hollow shaft, the at least twelve magnetic field sensors including:
(i) a first subset of eight magnetic field sensors arranged at a first radial distance from an axis of the rotatable hollow shaft, and the eight magnetic field sensors are spaced apart from each other by 45 degrees, and
(ii) a second subset of four magnetic field sensors arranged at a second radial distance from the axis of the rotatable hollow shaft that is less than the first radial distance, and the four magnetic field sensors are spaced apart from each other by 90 degrees; and
a measurement signal processing unit to process signals of the magnetic field sensors,
wherein each of the magnetic field sensors has an electrical or logical connection that is guided individually to the measurement signal processing unit, such that signals from the magnetic field sensors are processed individually by the measurement signal processing unit.

* * * * *